(12) United States Patent
Kato (10) Patent No.: US 11,532,966 B2
(45) Date of Patent: Dec. 20, 2022

(54) TERMINAL CONNECTION STRUCTURE FOR ROTARY MACHINE

(71) Applicant: TOYOTA JIDOSHA KABUSHIKI KAISHA, Toyota (JP)

(72) Inventor: Hiroki Kato, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 16/846,741

(22) Filed: Apr. 13, 2020

(65) Prior Publication Data

US 2020/0343782 A1 Oct. 29, 2020

(30) Foreign Application Priority Data

Apr. 24, 2019 (JP) .............................. JP2019-083415

(51) Int. Cl.
*H02K 5/22* (2006.01)
*H01R 9/24* (2006.01)
*H01R 9/18* (2006.01)
*H01R 39/24* (2006.01)
*H02K 5/14* (2006.01)

(52) U.S. Cl.
CPC ............... *H02K 5/225* (2013.01); *H01R 9/18* (2013.01); *H01R 9/24* (2013.01); *H01R 39/24* (2013.01); *H02K 5/145* (2013.01)

(58) Field of Classification Search
CPC .......... H02K 5/225; H02K 5/145; H02K 3/50; H01R 9/18; H01R 9/24; H01R 39/24; H01R 4/302; H01R 11/12

USPC ......................................................... 310/71
See application file for complete search history.

(56) References Cited

U.S. PATENT DOCUMENTS

| | | | |
|---|---|---|---|
| 2006/0189222 A1 | 8/2006 | Bogiel et al. | |
| 2007/0004291 A1 | 1/2007 | Bogiel et al. | |
| 2009/0006591 A1 | 3/2009 | Hamada et al. | |
| 2014/0354094 A1* | 12/2014 | Yazaki | H02K 3/522 |
| | | | 310/71 |
| 2016/0020658 A1 | 1/2016 | Tamura | |
| 2016/0366778 A1 | 12/2016 | Liu et al. | |
| 2017/0110810 A1* | 4/2017 | Kurono | H01R 9/24 |
| 2017/0110929 A1 | 4/2017 | Egami et al. | |
| 2020/0343782 A1* | 10/2020 | Kato | H01R 39/24 |

FOREIGN PATENT DOCUMENTS

| | | | |
|---|---|---|---|
| CN | 1832266 A | | 9/2006 |
| CN | 202142940 U | | 2/2012 |
| JP | 2007259553 | * | 10/2007 |
| JP | 2008-302797 A | | 12/2008 |
| JP | 2009-038139 A | | 2/2009 |
| JP | 2013171719 | * | 9/2013 |
| JP | 2014-042430 A | | 3/2014 |

(Continued)

*Primary Examiner* — Ahmed Elnakib
(74) *Attorney, Agent, or Firm* — Oblon, McClelland, Maier & Neustadt, L.L.P.

(57) ABSTRACT

A terminal connection structure for a rotary machine which electrically connects the rotary machine and a terminal block of a power control unit, comprises a terminal including a layered portion connected to a winding of the rotary machine and formed by layering at least a first conductor portion and a second conductor portion; and a fastening member fastening the terminal and the terminal block of the power control unit.

8 Claims, 3 Drawing Sheets

(56) References Cited

FOREIGN PATENT DOCUMENTS

| JP | 2016-25744 A | 2/2016 |
|---|---|---|
| JP | 2017-005241 A | 1/2017 |
| JP | 2017-79528 A | 4/2017 |

\* cited by examiner

TERMINAL CONNECTION STRUCTURE FOR ROTARY MACHINE

This application claims priority from Japanese Patent Application No. 2019-083415 filed on Apr. 24, 2019, the disclosure of which is incorporated herein by reference in its entirety.

FIELD OF THE ART

The present invention relates to a terminal connection structure for a rotary machine which electrically connects the rotary machine and a power control unit.

BACKGROUND ART

A terminal connection structure for a rotary machine which electrically connects the rotary machine and a power control unit is known. As an example, there is a terminal connection structure for a rotary machine described in Patent Document 1.

PRIOR ART DOCUMENT

Patent Document

[Patent Document 1] Japan Patent Publication No. 2016-25744

SUMMARY OF THE INVENTION

Problem to be Solved by the Invention

In a terminal connection structure for a rotary machine which electrically connects the rotary machine and a power control unit (for example, an inverter) as described in Patent Document 1, it is conceivable to fasten a terminal connected to a winding of the rotary machine to a terminal block provided in a power control unit by a fastening member such as a bolt. Meanwhile, in a case where an electric current flowing to a terminal is large as in the case of a rotary machine, electric resistance of the terminal needs to be decreased by increasing the terminal in cross-sectional area. However, in such a case where the terminal is increased in thickness to increase the cross-sectional area of the terminal, rigidity of the terminal becomes high, and an axial force of the fastening member may become insufficient or mechanical strengths of the terminal and the terminal block may become insufficient. On the other hand, to reduce the rigidity of the terminal, if the terminal is made large in shape without increasing the thickness of the terminal, a problem occurs in which a space for installation of the terminal needs to be increased.

The present invention was made in view of the above-described circumstances, and an object thereof is to provide a terminal connection structure for a rotary machine, capable of preventing an axial force of a fastening member from becoming insufficient and mechanical strengths of a terminal and a terminal block from becoming insufficient by reducing rigidity of the terminal.

Solution to Problem

To achieve the above object, a first aspect of the present invention provides a terminal connection structure for a rotary machine which electrically connects the rotary machine and a terminal block of a power control unit, comprising: a terminal including a layered portion connected to a winding of the rotary machine and formed by layering at least a first conductor portion and a second conductor portion; and a fastening member fastening the terminal and the terminal block of the power control unit.

A second aspect of the present invention provides the terminal connection structure for the rotary machine recited in the first aspect of the invention, wherein a stacking direction of the first conductor portion and the second conductor portion is the same as an axis direction of the fastening member.

A third aspect of the present invention provides the terminal connection structure for the rotary machine recited in the first or second aspect of the invention, wherein the first conductor portion and the second conductor portion are respectively plate-shaped metal bodies having the same shape.

A fourth aspect of the present invention provides the terminal connection structure for the rotary machine recited in any one of the first to third aspects of the invention, wherein (a) the terminal includes a connection portion electrically connected to the layered portion and having a rigidity and a mechanical strength higher than the layered portion, and (b) in the connection portion, the terminal and the terminal block of the power control unit are fastened by the fastening member.

Advantageous Effects of Invention

The terminal connection structure for the rotary machine according to the first aspect of the invention includes the terminal including the layered portion connected to the winding of the rotary machine and formed by layering at least the first conductor portion and the second conductor portion, and the fastening member fastening the terminal and the terminal block of the power control unit. In this way, the terminal is formed with a layered structure, and accordingly, rigidity of the terminal is made low while a required cross-sectional area of the terminal is maintained, so that it becomes possible to downsize the terminal, and an axial force of the fastening member is prevented from becoming insufficient and mechanical strengths of the terminal and the terminal block are prevented from becoming insufficient.

According to the terminal connection structure for the rotary machine in the second aspect of the invention, the stacking direction of the first conductor portion and the second conductor portion is the same as the axis direction of the fastening member. The terminal is configured by including the layered portion formed by layering in the same direction as the axis direction of the fastening member, so that as compared with a case where the terminal does not include the layered portion, rigidity against bending deformation of the terminal in the axis direction of the fastening member is particularly reduced. Accordingly, the terminal easily deforms in the axis direction with respect to an assembling tolerance in the axis direction of the fastening member, so that the axial force of the fastening member is prevented from becoming insufficient, and the mechanical strengths of the terminal and the terminal block are prevented from becoming insufficient.

According to the terminal connection structure for the rotary machine in the third aspect of the invention, the first conductor portion and the second conductor portion are respectively plate-shaped metal bodies having the same shape. In this way, the layered portion included by the terminal has a simple structure in which the plate-shaped metal bodies having the same shape are layered, so that an increase in manufacturing cost can be suppressed.

According to the terminal connection structure for the rotary machine in the fourth aspect of the invention, (a) the terminal includes the connection portion electrically connected to the layered portion and having the rigidity and the mechanical strength higher than the layered portion, and (b) in the connection portion, the terminal and the terminal block of the power control unit are fastened by the fastening member. Since the terminal includes the layered portion that has lower rigidity than the connection portion and the connection portion that has higher rigidity and mechanical strength than the layered portion, while both of preventing the axial force of the fastening member from becoming insufficient and preventing the mechanical strengths of the terminal and the terminal block from becoming insufficient are realized, the terminal can be easily downsized.

MODES FOR CARRYING OUT THE INVENTION

Hereinafter, an example of the present invention is described in detail with reference to the drawings. In the following example, the drawings are simplified or deformed as appropriate, and thus ratios of dimensions, shapes and the like of respective portions are not always accurately drawn.

Example

Figure 1:
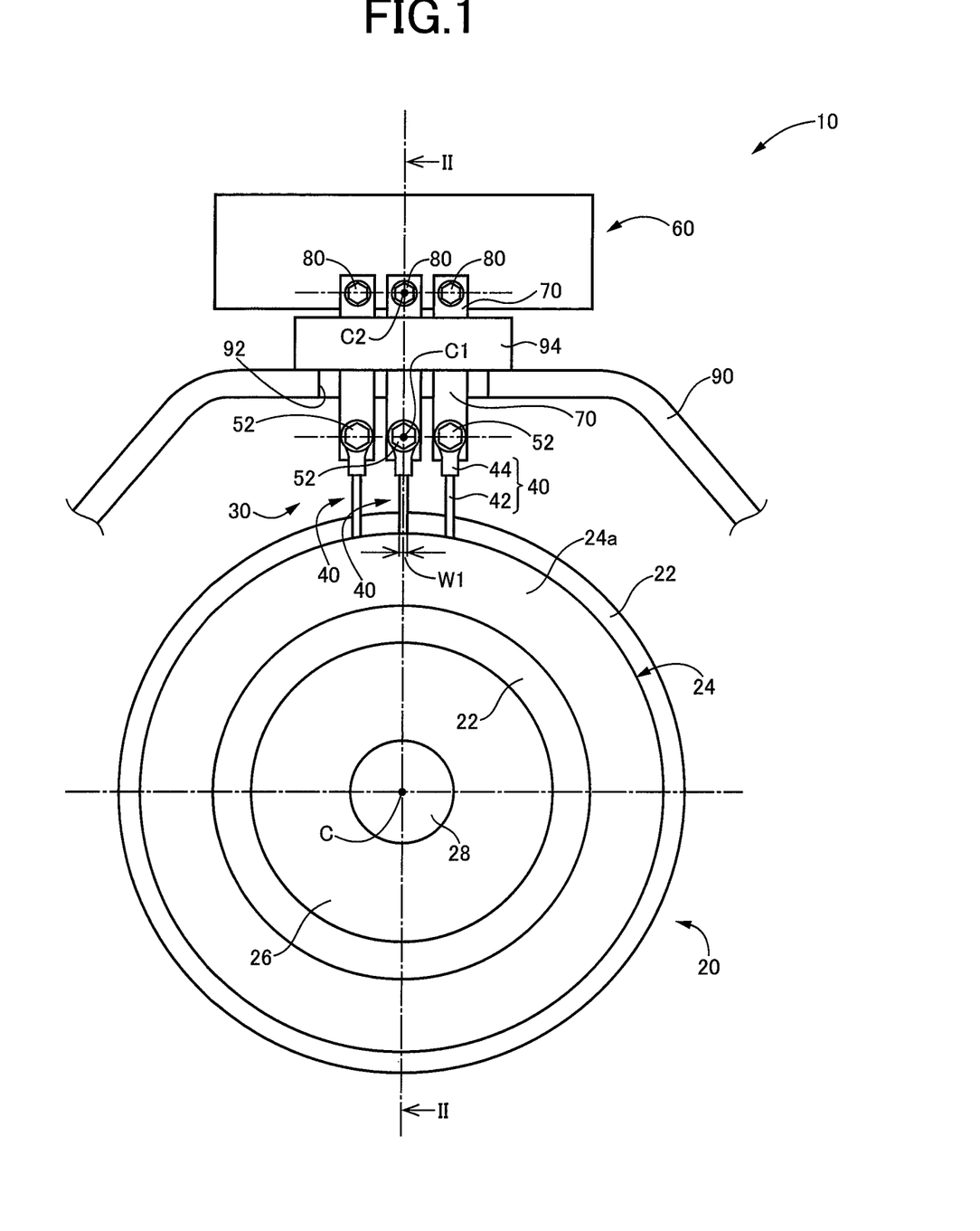
FIG. 1 is a view of a vehicle driving device equipped with a terminal connection structure according to an example of the present invention as viewed from a rotational center line C direction of an electric motor.
Figure 2:
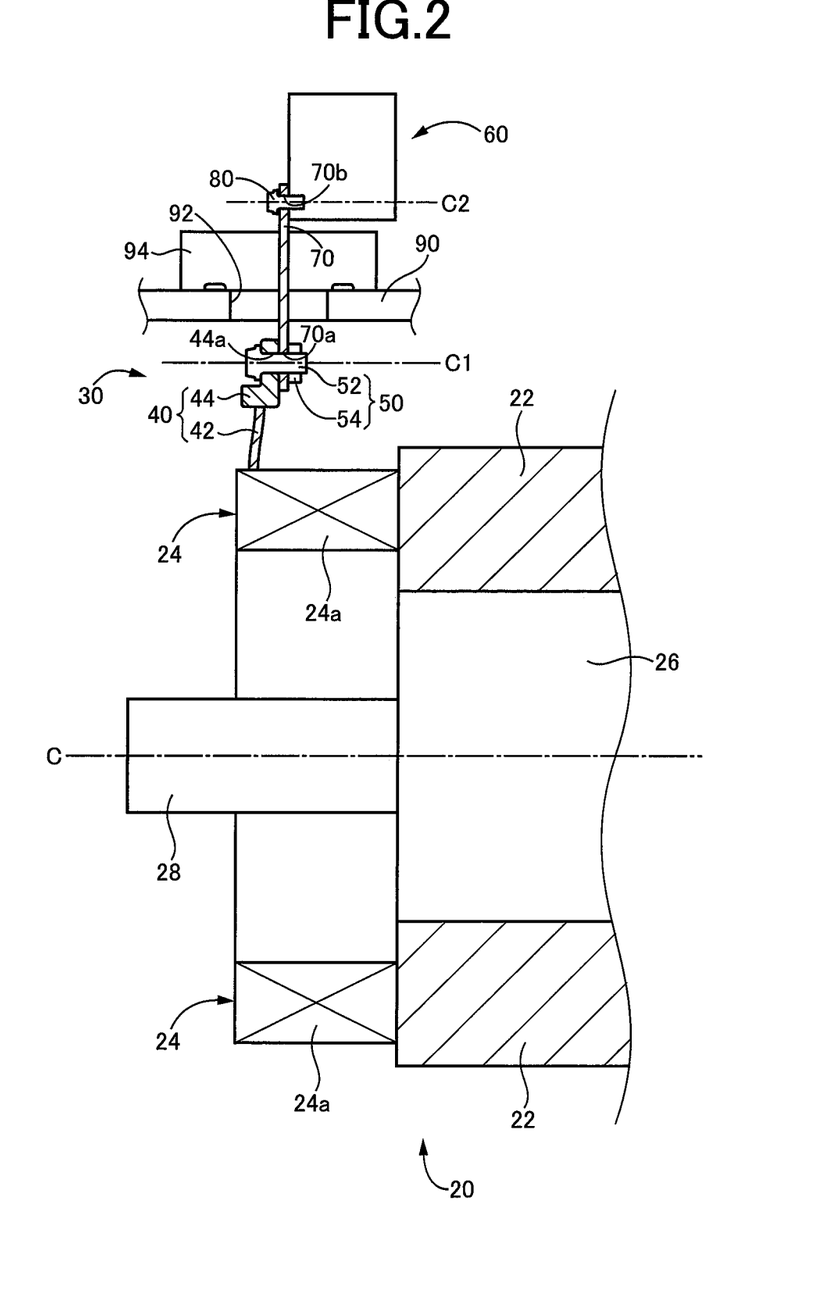
FIG. 2 is a sectional view taken along II-II in FIG. 1.

FIG. 1 is a view of a vehicle driving device 10 equipped with a terminal connection structure 30 according to an example of the present invention as viewed from a rotational center line C direction of an electric motor 20. In FIG. 1, only a portion of a casing 90 is described. FIG. 2 is a sectional view taken along II-II in FIG. 1.

The vehicle driving device 10 includes the electric motor 20, a power control unit 60 (hereinafter, referred to as "PCU 60"), the terminal connection structure 30, and the casing 90.

In, for example, a hybrid car or an electric vehicle (EV), the electric motor 20 is a so-called motor generator having a motor function as a drive source of the vehicle driving device 10 as well as a regenerative function (generator function) that converts motion energy of a vehicle into electric power when the vehicle slows down, and has a known configuration. The electric motor 20 includes a stator 22, a rotor 26, and a rotor shaft 28. The electric motor 20 corresponds to the "rotary machine" in the present invention.

The stator 22 has a cylindrical shape centered at the rotational center line C. In the stator 22, a plurality of stator tooth portions that project radially inward from an inner circumferential surface of an annular stator core portion are provided. Between the stator tooth portions adjacent to each other in the circumferential direction, a slot as a groove-shaped space is formed. In each of the slots, to make the stator tooth portion between the slots serve as an electromagnet, a winding 24 is wound to form a coil. The winding 24 is, for example, a longitudinal conductor plate, such as a ribbon-shaped copper plate or the like and insulation-coated. Portions at which the windings 24 project in the rotational center line C direction from the slots formed in the stator 22 are coil ends 24a. In the rotational center line C direction, the coil ends 24a are at one end portion side of the stator 22 as shown in FIG. 1 and FIG. 2, and at the other end portion side not shown of the stator 22.

The rotor 26 is disposed concentrically with the rotational centerline C of the stator 22 via a space at a radially inner side of the stator 22.

In the electric motor 20, a rotating magnetic field is generated by, for example, applying alternate currents with different phases to the coils formed by winding the windings 24 in the stator 22, and by making the rotor 26 be attracted to or repel the rotating magnetic field, the rotor 26 is rotated. The rotor shaft 28 is coupled to the rotor 26 so as not to rotate relative to the rotor 26, and the rotor 26 and the rotor shaft 28 rotate integrally.

The PCU 60 converts DC power from a battery not shown into AC power and supplies the AC power to the electric motor 20 for driving, and converts AC power generated in the electric motor 20 into DC power and charges the DC power in the battery.

The PCU 60 is provided with terminal blocks 70 that are conductors. The terminal blocks 70 are, for example, longitudinal plate-shaped members. The terminal blocks 70 are provided, for example, three in number corresponding to the U phase, the V phase, and the W phase of three-phase AC. The respective three terminal blocks 70 have the same configuration, so that one terminal block 70 as representative of the three will be described hereinafter. In both end portions of the terminal block 70, a through hole 70a that penetrates in a first axis C1 direction parallel to the rotational center line C, and a through hole 70b that penetrates in a second axis C2 direction parallel to the rotational center line C, are provided. By rotating a second bolt 80 inserted through the through hole 70b around the second axis C2 and screw-fitting the second bolt 80 into a female screw hole not shown provided in a power terminal in the PCU 60, the terminal block 70 is coupled and fixed to the power terminal of the PCU 60.

Corresponding to the terminal blocks 70 that are provided three in number corresponding to the U phase, the V phase, and the W phase of three-phase AC, the terminal connection structures 30 that are also three in number are provided. The respective three terminal connection structures 30 have the same configuration, so that one terminal connection structure 30 as representative of the three is described below. The terminal connection structure 30 includes a terminal 40 and a fastening member 50. One end portion of the terminal 40 at the electric motor 20 side is electrically connected to the winding 24 of the coil end 24a by, for example, welding. The other end portion of the terminal 40 at the PCU 60 side is electrically connected to the terminal block 70 by the fastening member 50. The fastening member 50 has, for example, a first bolt 52 and a first nut 54 to be screw-fitted to the first bolt 52.

The terminal 40 includes a first terminal portion 42 and a second terminal portion 44. Both of the first terminal portion 42 and the second terminal portion 44 are conductors of, for example, aluminum, copper, or the like.

The first terminal portion 42 is, for example, a longitudinal plate-shaped metal body. One end portion of the first terminal portion 42 at the electric motor 20 side is electrically connected to the winding 24 of the coil end 24a, and the other end portion at the PCU 60 side is electrically connected to the second terminal portion 44. That is, the one end portion of the first terminal portion 42 that is the one end portion of the terminal 40 is fixed to and electrically connected to the winding 24 of the coil end 24a by welding as described above. In the present example, although not shown in the drawings, in a portion overlapping the coil end 24a as viewed from the rotational center line C direction, the first terminal portion 42 is fixed to the winding 24 of the coil end 24a. In the following description, the first terminal portion 42 (including a first conductor portion 42a and a second conductor portion 42b described later) means a portion between the portion fixed to the winding 24 of the coil end 24a and the second terminal portion 44 when no particular distinction is needed.

The second terminal portion 44 is a plate-shaped metal body having an L shape at one end portion side on the electric motor 20 side, and provided with a through hole 44a that penetrates in the first axis C1 direction at the other end portion side on the PCU 60 side. At the portion bent into the L shape at the one end portion of the second terminal portion 44, the second terminal portion 44 is electrically connected to the other end portion of the first terminal portion 42, and connected to the terminal block 70 at the other end portion of the second terminal portion 44.

As illustrated in FIG. 1 and FIG. 2, the other end portion of the second terminal portion 44 and the terminal block 70 are pressure-clamped by the first bolt 52 that is inserted through the through hole 44a and the through hole 70a and rotates around the first axis C1, and the first nut 54. Accordingly, the second terminal portion 44 and the terminal block 70 are electrically connected. In this way, the electric motor 20 and the PCU 60 are electrically connected to each other by the terminal connection structure 30. The first axis C1 direction corresponds to the "axis direction of the fastening member" in the present invention.

The casing 90 as a non-rotatable member of the vehicle driving device 10 houses the electric motor 20 and the terminal connection structures 30 inside, and couples and fixes the stator 22. The casing 90 supports the rotor shaft 28 via a bearing not shown. A central portion in a longitudinal direction of the terminal block 70 is fixed to a lid body 94 extending in a direction perpendicular to the longitudinal direction of the terminal block 70. In the terminal block 70, the above-described through hole 70a is provided at one end portion projecting from the lid body 94 to the electric motor 20 side, and the above-described through hole 70b is provided at the other end portion projecting from the lid body 94 to the power terminal side of the PCU 60. An opening 92 provided in the casing 90 is closed by the lid body 94 outside the casing 90.

A portion of the coil end 24a fixed to the first terminal portion 42, the second terminal portion 44, the terminal block 70, and the lid body 94 are made to have higher rigidity than the first terminal portion 42 by their materials and shapes. When the terminal 40 and the terminal block 70 are connected to each other by the fastening member 50, portions that are deformable to allow an assembling tolerance CD [mm] described later are the first terminal portion 42, the second terminal portion 44, and the terminal block 70 that are present between the portion of the coil end 24a fixed to the first terminal portion 42 and the lid body 94. Among these, a portion to be mainly deformed is the first terminal portion 42 whose rigidity is made lowest.

The second terminal portion 44 is made to have higher mechanical strength than the first terminal portion 42. For example, as shown in FIG. 1, a width of the second terminal portion 44 is made larger than a terminal width W1 [mm] of the first terminal portion 42, and as shown in FIG. 2, a thickness of the second terminal portion 44 is made larger than a terminal thickness T1 [mm] (refer to FIG. 3) of the first terminal portion 42, and accordingly, the second terminal portion 44 has higher mechanical strength. Therefore, the second terminal portion 44 is made to have higher mechanical strength than the first terminal portion 42 and resist pressure-clamping by the first bolt 52 and the first nut 54. The mechanical strength is a degree of durability to a physical external force such as compression and tension, and is a degree of strength (resistance force) against deformation and breakage.

Figure 3:
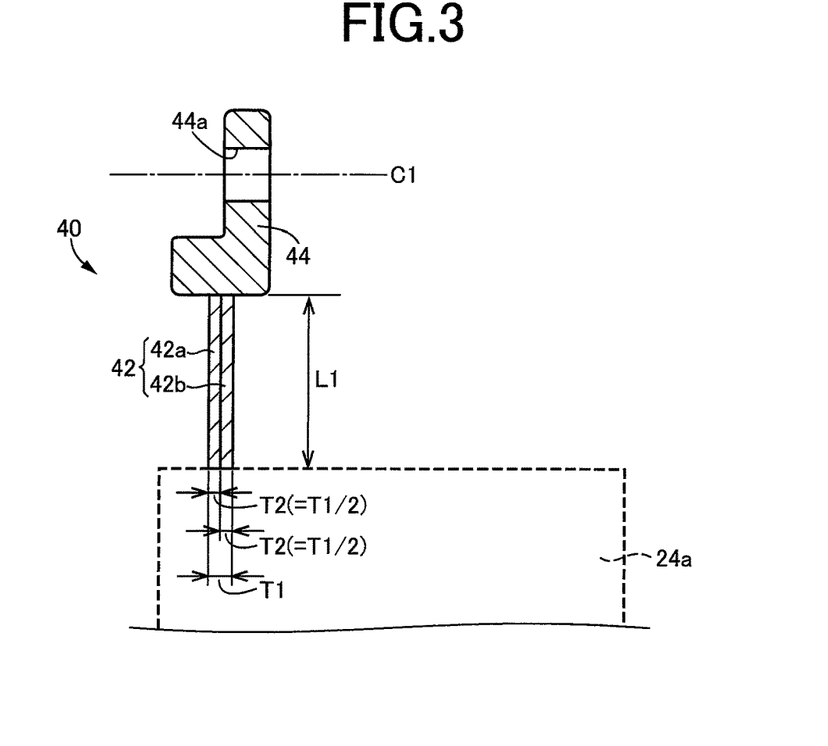
FIG. 3 is an enlarged view of the terminal shown in FIG. 2.

FIG. 3 is an enlarged view of the terminal 40 shown in FIG. 2. The first terminal portion 42 includes two conductor portions of the first conductor portion 42a and the second conductor portion 42b layered in the same direction as the first axis C1. The first conductor portion 42a and the second conductor portion 42b (including portions fixed to the winding 24 of the coil end 24a) are plate-shaped metal bodies having the same shape. Each of the first conductor portion 42a and the second conductor portion 42b has the terminal width W1 (refer to FIG. 1), a terminal thickness T2 [mm] (=T1/2) and a terminal length L1 [mm] as shown in FIG. 3. Therefore, the entire first terminal portion 42 formed by layering the first conductor portion 42a and the second conductor portion 42b has the terminal width W1, the terminal thickness T1, and the terminal length L1. In this way, in the first terminal portion 42, two plate-shaped metal bodies are layered, so that as compared with a case where the first terminal portion 42 is formed of a single-layer plate-shaped metal body having the same shape (with the terminal width W1, the terminal thickness T1, and the terminal length L1), electric resistance of the first terminal portion 42 is equivalent, however, the rigidity is lower. The first terminal portion 42 between the portion fixed to the winding 24 of the coil end 24a and the second terminal portion 44 corresponds to the "layered portion" in the present invention, and the second terminal portion 44 corresponds to the "connection portion" in the present invention. "Layered" in the present invention does not always mean stacked in a contact state, and includes a case where even when there is a slight gap between the layered members, the members have the substantially equivalent function to that of the members layered in the contact state.

Figure 4:
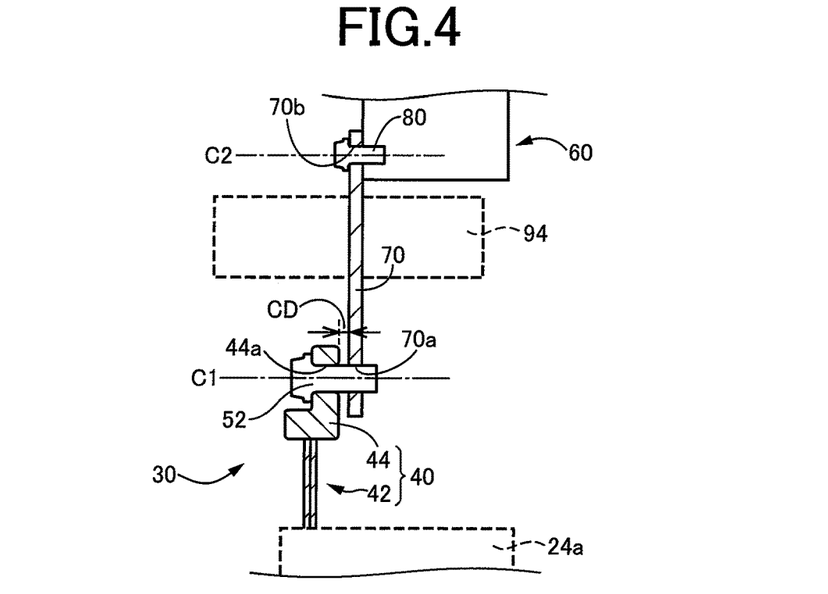
FIG. 4 is a view describing a state before the terminal is fastened to the terminal block in the terminal connection structure shown in FIG. 2.

FIG. 4 is a view describing a state before the terminal 40 is fastened to the terminal block 70 in the terminal connection structure 30 shown in FIG. 2.

As shown in FIG. 4, in the terminal connection structure 30, in the state before the terminal 40 is fastened to the terminal block 70, that is, before the terminal 40 is assembled to the terminal block 70, there is the assembling tolerance CD in, for example, the first axis C1 direction. The assembling tolerance CD is a permissible dimensional difference before the terminal 40 is assembled to the terminal block 70. If the rigidity of the first terminal portion 42 is relatively high, there is a risk that the first bolt 52 and the first nut 54 are not sufficiently tightened due to the assembling tolerance CD and an axial force of the fastening member 50 becomes insufficient, or conversely, that the fastening member 50 is excessively fastened to maintain the required axial force of the fastening member 50 causing mechanical strengths of the terminal 40 and the terminal block 70 to become insufficient. The axial force is a force with which the fastening member 50 is resistant to deformation such as stretch and contraction in the first axis C1 direction that is the axis direction of the fastening member 50, and by the axial force, the terminal 40 and the terminal block 70 as members to be fastened are fixed. In the present example, the rigidity of the first terminal portion 42 is made relatively low, so that when the terminal 40 and the terminal block 70 are fastened by the first bolt 52 and the first nut 54, the first terminal portion 42 with comparatively low rigidity is bent in the first axis C1 direction and deformed, and accordingly, the assembling tolerance CD is permitted.

Here, for comparison with the example, a case where the first terminal portion 42 of the terminal 40 is formed of a single-layer plate-shaped metal body is described.

As in the electric motor 20, when an electric current flowing to the terminal 40 is large, it is necessary to prevent electric resistance of the first terminal portion 42 from becoming high. In order to permit the assembling tolerance CD as described above, it is also necessary to prevent rigidity of the first terminal portion 42 from becoming high.

To reduce the rigidity while preventing electric resistance of the first terminal portion 42 from becoming high, it is necessary that, for example, the terminal length L1 of the first terminal portion 42 is increased, and in response to the increase in the terminal length L1, a terminal cross-sectional area S1 [mm$^2$] of the first terminal portion 42 is increased, or the terminal width W1 is increased while the terminal thickness T1 of the first terminal portion 42 is reduced so that the required terminal cross-sectional area S1 is maintained. However, in this case, the first terminal portion 42 becomes large, so that the installation space for the terminal 40 needs to be made large.

The terminal connection structure 30 of the electric motor 20 according to the present example includes the terminal 40 including the first terminal portion 42 as the layered portion which is connected to the winding 24 of the electric motor 20 and in which the first conductor portion 42a and the second conductor portion 42b are layered, and the fastening member 50 including the first bolt 52 and the first nut 54 to fasten the terminal 40 and the terminal block 70 of the PCU 60. In this way, the first terminal portion 42 of the terminal 40 is formed with a layered structure, and accordingly, rigidity of the first terminal portion 42 is made low while the required terminal cross-sectional area S1 of the first terminal portion 42 is maintained, so that it becomes possible to downsize the terminal 40, and the axial force of the fastening member 50 is prevented from becoming insufficient and the mechanical strengths of the terminal 40 and the terminal block 70 are prevented from becoming insufficient. In addition, when the terminal 40 is downsized, it becomes possible to make smaller the assembling tolerance CD of the terminal 40 and the terminal block 70, and this also prevents the axial force of the fastening member 50 from becoming insufficient and the mechanical strengths of the terminal 40 and the terminal block 70 from becoming insufficient.

According to the terminal connection structure 30 of the electric motor 20 of the present example, a stacking direction of the first conductor portion 42a and the second conductor portion 42b is the same as the first axis C1 direction of the fastening member 50. The terminal 40 is configured by layering the first conductor portion 42a and the second conductor portion 42b in the same direction as the first axis C1 direction of the fastening member 50, so that as compared with the case where the first terminal portion 42 is formed of a single layer, rigidity against bending deformation of the first terminal portion 42 in the first axis C1 direction is particularly reduced. Accordingly, the first terminal portion 42 of the terminal 40 easily deforms in the first axis C1 direction with respect to the assembling tolerance CD in the first axis C1 direction, so that the axial force of the fastening member 50 is prevented from becoming insufficient, and the mechanical strengths of the terminal 40 and the terminal block 70 are prevented from becoming insufficient.

According to the terminal connection structure 30 of the electric motor 20 of the present example, the first conductor portion 42a and the second conductor portion 42b including the portions fixed to the winding 24 of the coil end 24a are respectively plate-shaped metal bodies having the same shape. In this way, the first terminal portion 42 has a simple structure in which the first conductor portion 42a and the second conductor portion 42b having the same shape are layered, so that an increase in manufacturing cost can be suppressed.

According to the terminal connection structure 30 of the electric motor 20 of the present example, (a) the terminal 40 includes the second terminal portion 44 that is electrically connected to the first terminal portion 42 and has rigidity and mechanical strength higher than the first terminal portion 42, and (b) in the second terminal portion 44, the terminal 40 and the terminal block 70 of the PCU 60 are fastened by the fastening member 50 having the first bolt 52 and the first nut 54. Since the terminal 40 includes the first terminal portion 42 that has lower rigidity than the second terminal portion 44 and the second terminal portion 44 that has higher rigidity and mechanical strength than the first terminal portion 42, while both of preventing the axial force of the fastening member 50 from becoming insufficient and preventing the mechanical strengths of the terminal 40 and the terminal block 70 from becoming insufficient are realized, the terminal 40 can be easily downsized.

An example of the present invention is described above based on the drawings, and the present invention is also applied in other forms.

In the example described above, the first terminal portion 42 is formed by layering two conductor portions, i.e. the first conductor portion 42a and the second conductor portion 42b, however, the first terminal portion 42 is not limited to the example. For example, in the first terminal portion 42, three conductor portions that are plate-shaped metal bodies with the terminal width W1, a terminal thickness T3 [mm] (=T1/3), and the terminal length L1 may be layered. In other words, at least two, that is, a plurality of conductor portions are required to be layered.

In the example described above, the stacking direction of the first conductor portion 42a and the second conductor portion 42b is a thickness direction of the first terminal portion 42, and is the same direction as the first axis C1 of the first bolt 52 and the first nut 54, however, the stacking direction is not limited to the example. For example, the stacking direction may be a width direction of the first terminal portion 42, which is different from the first axis C1 direction. In detail, the first terminal portion 42 may be configured by layering two plate-shaped metal bodies with a terminal width W2 [mm] (=W1/2), the terminal thickness T1, and the terminal length L1 in the width direction. Even with this configuration, while the required terminal cross-sectional area S1 of the first terminal portion 42 is maintained, the rigidity of the first terminal portion 42 is reduced to be lower than in the case where the first terminal portion 42 is formed of a single layer, and the terminal 40 can be downsized.

In the example described above, the first conductor portion 42a and the second conductor portion 42b including the portions fixed to the winding 24 of the coil end 24a are plate-shaped metal bodies having the same shape, however, the first conductor portion 42a and the second conductor portion 42b are not limited to the example. For example, the first conductor portion 42a and the second conductor portion 42b may be plate-shaped metal bodies having shapes different from each other. The first conductor portion 42a and the second conductor portion 42b may not be plate-shaped metal bodies. For example, the first conductor portion 42a and the second conductor portion 42b may have rectangular parallelepiped shapes, etc., with the same width and the same thickness.

In the example described above, in the terminal 40, the first terminal portion 42 that constitutes a portion of the terminal 40 is formed as the layered portion, however, the terminal 40 is not limited to the example. For example, in a case where sufficient mechanical strength against fastening by the first bolt 52 and the first nut 54 is had for the layered first terminal portion 42, the terminal 40 may be configured without the second terminal portion 44. In this configuration, a hole corresponding to the through hole 44a is provided in the first terminal portion 42.

In the example described above, FIG. 4 shows the case where the assembling tolerance CD is in the first axis C1 direction, however, the assembling tolerance CD is not limited to the example. For example, even when the assembling tolerance CD is in the width direction of the terminal 40, by forming the first terminal portion to have a layered structure, while the required terminal cross-sectional area S1 of the first terminal portion 42 is maintained, rigidity of the first terminal portion 42 is reduced to be lower than in the case where the first terminal portion 42 is formed of a single layer, and the terminal 40 can be downsized.

In the example described above, the fastening member 50 includes the first bolt 52 and the first nut 54, however, the fastening member 50 is not limited to the example. For example, a configuration is also allowed in which a female screw hole is provided in the terminal block 70, and the first bolt 52 that is inserted through the through hole 44a and the through hole 70a and rotates around the first axis C1 is screw-fitted into the female screw hole. The fastening member 50 may be a rivet that is inserted through the through hole 44a and the through hole 70a and fastened.

In the example described above, the electric motor 20 as the rotary machine is a motor generator, however, the electric motor 20 is not limited to the example. For example, the electric motor 20 may have either one of the motor function and the regenerative function.

The foregoing is only an embodiment, and the present invention can be carried out in variously modified or improved forms based on knowledge of a person skilled in the art.

REFERENCE SIGNS LIST

20: electric motor (rotary machine)
24: winding
30: terminal connection structure
40: terminal
42: first terminal portion (layered portion)
42a: first conductor portion
42b: second conductor portion
44: second terminal portion (connection portion)
50: fastening member
60: power control unit
70: terminal block
C1: first axis (axis)

What is claimed is:

1. A terminal connection structure for a rotary machine provided in a casing, comprising:
   a terminal block made of conductor, a first end of the terminal block connected to a power control unit provided outside the casing, wherein the terminal connection structure connects between a second end of the terminal block and the rotary machine;
   a lid body to close an opening of the casing while the terminal block penetrates the lid body;
   a terminal including a layered portion connected to a winding of the rotary machine and formed by layering at least a first conductor portion and a second conductor portion; and
   a fastening member fastening the terminal and the second end of the terminal block of the power control unit.

2. The terminal connection structure for the rotary machine according to claim 1, wherein
   a stacking direction of the first conductor portion and the second conductor portion is the same as an axis direction of the fastening member.

3. The terminal connection structure for the rotary machine according to claim 2, wherein
   the first conductor portion and the second conductor portion are respectively plate-shaped metal bodies having the same shape.

4. The terminal connection structure for the rotary machine according to claim 3, wherein
   the terminal includes a connection portion electrically connected to the layered portion and having a rigidity and a mechanical strength higher than the layered portion, and
   in the connection portion, the terminal and the terminal block of the power control unit are fastened by the fastening member.

5. The terminal connection structure for the rotary machine according to claim 2, wherein
   the terminal includes a connection portion electrically connected to the layered portion and having a rigidity and a mechanical strength higher than the layered portion, and
   in the connection portion, the terminal and the terminal block of the power control unit are fastened by the fastening member.

6. The terminal connection structure for the rotary machine according to claim 1, wherein
   the first conductor portion and the second conductor portion are respectively plate-shaped metal bodies having the same shape.

7. The terminal connection structure for the rotary machine according to claim 6, wherein
   the terminal includes a connection portion electrically connected to the layered portion and having a rigidity and a mechanical strength higher than the layered portion, and
   in the connection portion, the terminal and the terminal block of the power control unit are fastened by the fastening member.

8. The terminal connection structure for the rotary machine according to claim 1, wherein
   the terminal includes a connection portion electrically connected to the layered portion and having a rigidity and a mechanical strength higher than the layered portion, and in the connection portion, the terminal and the terminal block of the power control unit are fastened by the fastening member.

\* \* \* \* \*